H. G. THOMPSON & C. LUKE.
Tack-Driving Machine for Boots and Shoes.

No. 159,475.  Patented Feb. 2, 1875.

Witnesses:
Jas. J. Duhamel.
Thomas Byrne.

Inventor:
Henry G. Thompson.
Charles Luke.
Per H. J. Abbot.
Attorney.

UNITED STATES PATENT OFFICE.

HENRY G. THOMPSON AND CHARLES LUKE, OF MILFORD, CONNECTICUT; SAID LUKE ASSIGNOR TO SAID THOMPSON.

IMPROVEMENT IN TACK-DRIVING MACHINES FOR BOOTS AND SHOES.

Specification forming part of Letters Patent No. 159,475, dated February 2, 1875; application filed January 19, 1875.

CASE C.

*To all whom it may concern:*

Be it known that we, HENRY G. THOMPSON and CHAS. LUKE, of Milford, county of New Haven and State of Connecticut, have invented certain new and useful Improvements in Tack-Driving Machine for Boots and Shoes, of which the following is a specification:

Our invention relates to that class of tack-driving machines in which is employed a reciprocating revolving feed-cylinder having a stationary head and an inclined roadway for the passage of the tacks; and it consists in devices for feeding and separating tacks from a trap in the roadway before it reaches the bottom of the incline, as will be hereinafter more fully set forth.

Figure 1:
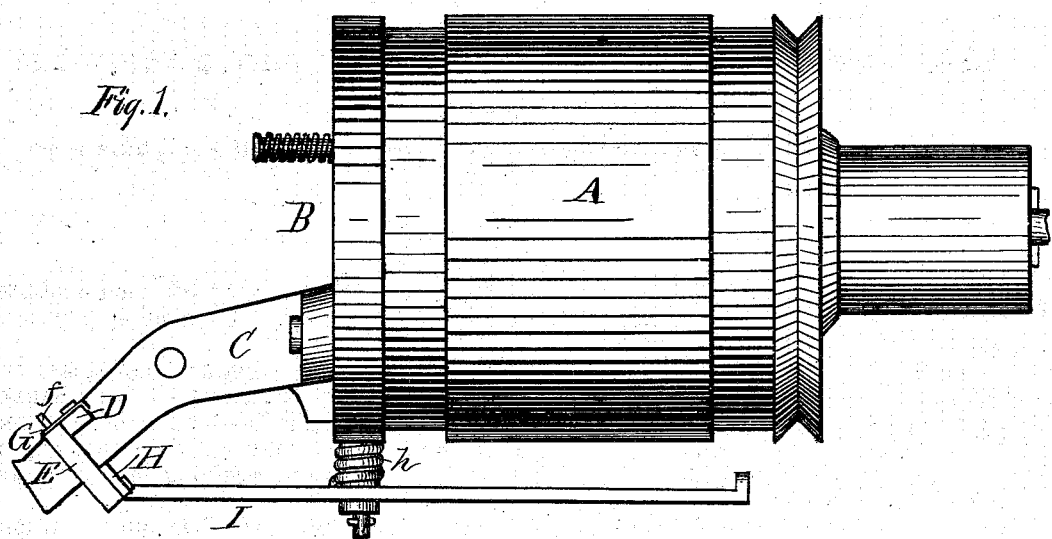
Figure 2:
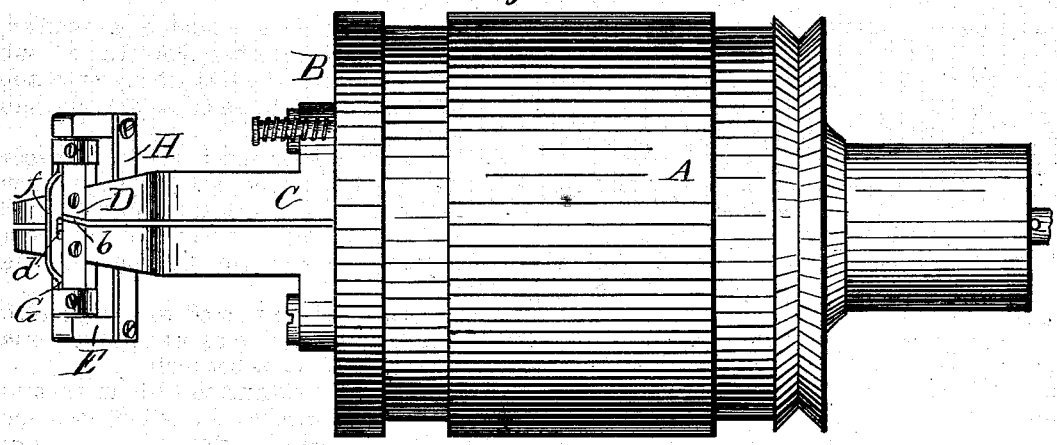
Figure 3:
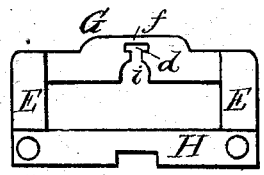

In the accompanying drawing, Figure 1 is a side elevation, and Fig. 2 a plan view, of a feeding-cylinder embodying our invention. Fig. 3 is a view of the push-bar.

A represents the feeding-cylinder, with stationary front head, B, through which the incline C passes, said incline having the roadway *a* formed in it.

In the incline C, a suitable distance above the lower end, is inserted a cross-bar, D, in which is formed the trap *b*, and immediately below this trap is formed a longitudinal groove for the reception of the push-bar G. In the center of the push-bar G is formed a T-shaped slot, *d*, large enough to receive one tack, and so that but one tack can enter it at a time, the push-bar acting upon the tail or sides of each tack singly. The push-bar forms a guard, *f*, over the head of each tack when taken from the trap *b*. The slot *d* in the push-bar opens with a semicircular or other opening, *i*, in the bottom of the bar, which opening is to receive the tail of the tack in the rear of the one about to be discharged, thereby preventing obstruction to the delivery of the one preceding, which would otherwise occur. At each end of the push-bar G is an arm, E, extending downward, the lower ends of which arms are connected by a cross-bar, H. In a slot on this bar works the end of a lever, I, which is pivoted to a stud on the bottom of the head B. The lever is connected to this stud by means of a spiral spring, *h*, which thereby actuates the push-bar to push the tack from the trap to the discharge-outlet. In case of any obstruction the spring will yield and prevent breakage to the mechanism employed to operate the same.

It is immaterial whether the tacks are trapped by being carried in a switch-channel away from a straight line, and then removed from the trap and delivered to a roadway in a straight line to the receiving-cup or the reverse.

Having thus fully described our invention, what we claim as new, and desire to secure by Letters Patent, is—

1. In a tack-driving machine, a roadway provided with a push-bar, constructed substantially as shown and described, for acting upon the tail or side of each tack singly, substantially as set forth.

2. In a tack-driving machine the push-bar, with its operating-lever and spring, in combination with a roadway extending through the stationary head of a revolving cylinder, substantially as and for the purpose described.

3. A push-bar, constructed with a guard to cover the head of each tack when taken from the roadway or trap, as set forth.

4. A push-bar, constructed with an opening at the bottom to receive the tail of each successive tack, in combination with the trap, substantially as and for the purposes set forth.

5. A push-bar, constructed to receive and act upon one tack at a time, provided with a guard above and an opening at the bottom, substantially as and for the purposes herein set forth.

6. A push-bar acting upon each successive tack separately, provided with a guard above and an opening beneath, in combination with the vibrating inclined roadway of a tack-driving machine, substantially as and for the purposes herein set forth.

In testimony that we claim the foregoing as our invention we hereunto affix our signatures this 11th day of January, 1875.

HENRY G. THOMPSON.
CHARLES LUKE.

Witnesses:
FRANK L. ALLIS,
HARRY GRANT THOMPSON.